US012440871B2

(12) United States Patent
Kamm et al.

(10) Patent No.: US 12,440,871 B2

(45) Date of Patent: Oct. 14, 2025

(54) MONITORING DEVICE FOR DETECTING AT LEAST ONE SUBSTANCE COMPONENT IN COMMINUTED MATERIALS, CONVEYING SYSTEM FOR COMMINUTED MATERIALS AND METHOD FOR MONITORING COMMINUTED MATERIALS

(71) Applicant: DIEFFENBACHER GMBH MASCHINEN—UND ANLAGENBAU, Eppingen (DE)

(72) Inventors: Jochen Kamm, Eppingen (DE); Felix Hofmann, Eppingen (DE)

(73) Assignee: DIEFFENBACHER GMBH MASCHINEN—UND ANLAGENBAU, Eppingen (DE)

( * ) Notice: Subject to any disclaimer, the term of this patent is extended or adjusted under 35 U.S.C. 154(b) by 0 days.

(21) Appl. No.: 17/614,057

(22) PCT Filed: May 25, 2020

(86) PCT No.: PCT/EP2020/064467

§ 371 (c)(1),
(2) Date: Nov. 24, 2021

(87) PCT Pub. No.: WO2020/239708

PCT Pub. Date: Dec. 3, 2020

(65) Prior Publication Data

US 2022/0226865 A1 Jul. 21, 2022

(30) Foreign Application Priority Data

May 26, 2019 (DE) ........................ 102019114033.1

(51) Int. Cl.
*B07C 5/342* (2006.01)
*B07C 5/36* (2006.01)

(52) U.S. Cl.
CPC .............. *B07C 5/342* (2013.01); *B07C 5/361* (2013.01)

(58) Field of Classification Search
CPC ......... B07C 5/342; B07C 5/34; B07C 5/3422; B07C 5/3425; B07C 5/3427; B07C 5/344; B07C 5/346; B07B 5/361
(Continued)

(56) References Cited

U.S. PATENT DOCUMENTS 5,435,445 A * 7/1995 Dellinger, Jr. ........ G07F 7/0609 209/583
5,448,074 A * 9/1995 Seagro, Jr. ............. G01N 21/64 250/461.1
(Continued)

FOREIGN PATENT DOCUMENTS

DE 10 2013 104 740 A1 11/2014
DE 202017107389 U1 1/2018
GB 2 300 480 A 11/1996

OTHER PUBLICATIONS

International Search Report on International Patent Application No. PCT/EP2020/064467 dated Sep. 28, 2020 with English Translation (5 pages).

*Primary Examiner* — Michael McCullough
*Assistant Examiner* — Jessica L Burkman
(74) *Attorney, Agent, or Firm* — Foley & Lardner LLP

(57) ABSTRACT

A monitoring device of a conveying system for comminuted materials includes at least one measuring apparatus, by which at least one substance component can be detected in the comminuted materials. Further, a conveying system and a method for monitoring comminuted materials are provided. At least one monitoring region, in which the content of at least one substance component in a comminuted material can be determined by at least one measuring apparatus, while the comminuted materials are being con- (Continued)

veyed, covers at least one portion of a conveying path of the conveying system. At least one rejection apparatus is arranged downstream of at least one monitoring region on the conveying path in the direction of conveyance of the comminuted materials. Via such a device, the comminuted materials can be rejected if the content of the at least one substance component determined by the at least one measuring apparatus exceeds a predetermined threshold value.

13 Claims, 1 Drawing Sheet

(58) Field of Classification Search
USPC .......................................................... 209/552
See application file for complete search history.

(56) References Cited

U.S. PATENT DOCUMENTS

| | | | | |
|---|---|---|---|---|
| 6,112,903 | A | 9/2000 | Kimmel et al. | |
| 2008/0257795 | A1* | 10/2008 | Shuttleworth | B07C 5/34 209/576 |
| 2011/0017644 | A1* | 1/2011 | Valerio | B07C 5/344 209/44.1 |
| 2012/0138512 | A1* | 6/2012 | Jones | B07C 5/363 209/552 |
| 2016/0082481 | A1* | 3/2016 | Grote | B07C 5/36 209/552 |
| 2021/0229133 | A1* | 7/2021 | Kumar | B07C 5/34 |

* cited by examiner

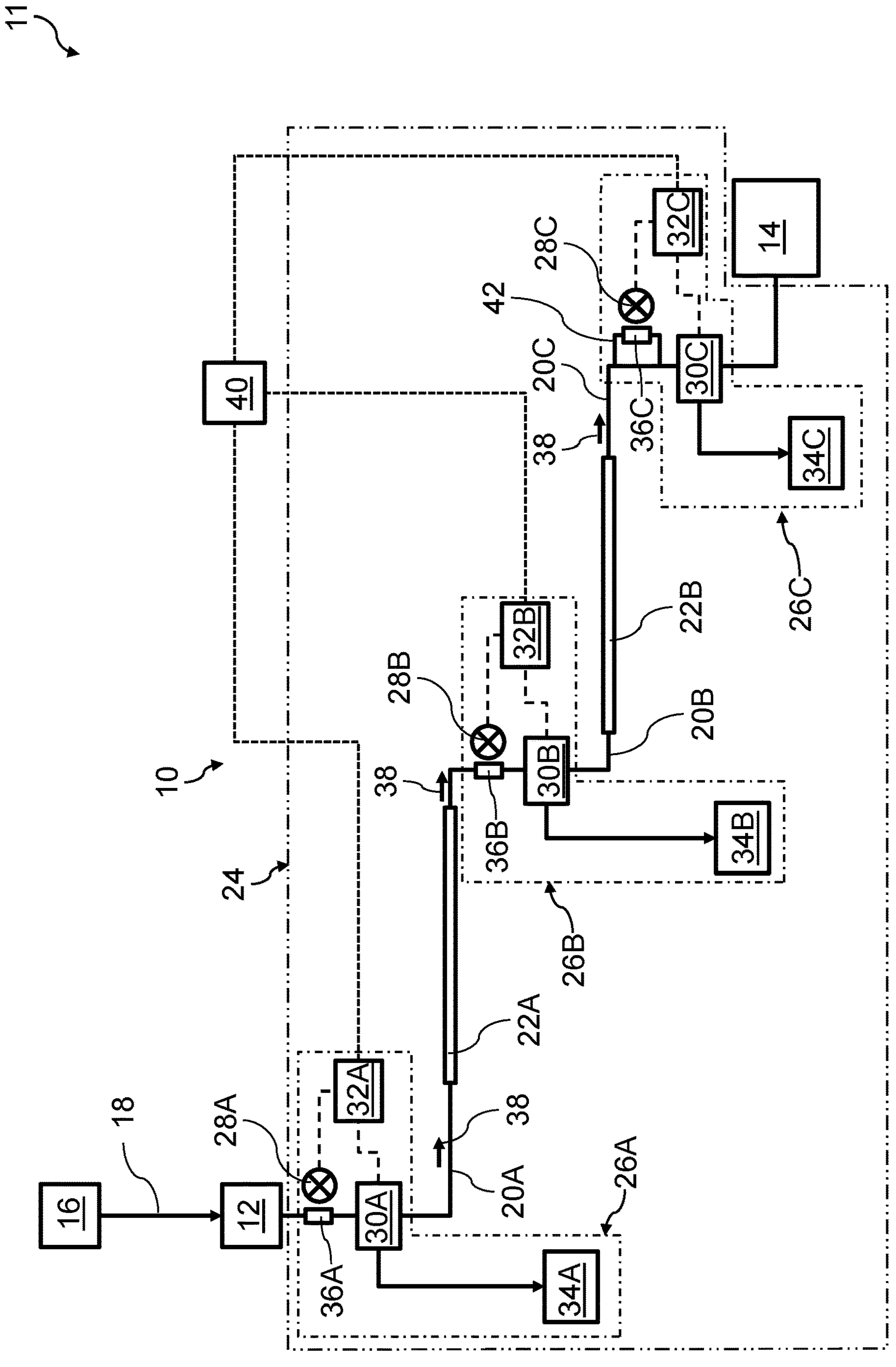
11
10
12
14
16
18
20A
20B
20C
22A
22B
24
26A
26B
26C
28A
28B
28C
30A
30B
30C
32A
32B
32C
34A
34B
34C
36A
36B
36C
38
38
38
40
42

MONITORING DEVICE FOR DETECTING AT LEAST ONE SUBSTANCE COMPONENT IN COMMINUTED MATERIALS, CONVEYING SYSTEM FOR COMMINUTED MATERIALS AND METHOD FOR MONITORING COMMINUTED MATERIALS

CROSS-REFERENCE TO RELATED PATENT APPLICATIONS

This application is a 371 national phase entry of International Patent Application No. PCT/EP2020/064467, filed May 25, 2020, which claims priority to German Patent Application No.: 102019114033.1, dated May 26, 2019, the contents of which are incorporated herein in their entirety by reference.

BACKGROUND

A device for taking samples from a stream of bulk material, and in particular from a stream of bulk material which is or can be produced by comminuting or shredding scrap material, in particular scrap wood is known from DE 20 2017 107 389 U1. Scrap wood (or other scrap material) which is provided is initially fed to a silo or input room, from which the scrap material is fed directly or via a conveyor line to a shredding or comminution installation. From this shredding or comminution installation, the comminuted scrap material passes in the form of a bulk material stream into a gravity-fed section, which in turn leads directly or via a further conveyor section to a bulk material collection container. The gravity-fed section is associated with a removal device which can be moved between a removal position and an emptying position. In the removal position, the bulk material picked up by the removal device is introduced into a sample container. If necessary, the material collected in the sample container is sent to a laboratory for examination after mixing, wherein the sample container can be used as a sealable transport container. In this way, the usability or alternatively quality of the material received in the collection container can then be determined.

SUMMARY OF THE INVENTION

The invention relates to a monitoring device of a conveying system for comminuted materials, comprising at least one measuring apparatus, by means of which at least one substance component can be detected in the comminuted materials.

The invention furthermore relates to a conveying system for comminuted materials, comprising at least one conveying device with which the comminuted materials can be conveyed along a conveying path, and having at least one monitoring device comprising at least one measuring apparatus with which at least one substance component in the comminuted materials can be detected.

Furthermore, the invention relates to a method for monitoring comminuted materials which are conveyed by a conveying system along at least one conveying path, in which at least one substance component in the comminuted materials is detected by at least one measuring apparatus.

The invention is based on the task of designing a monitoring device, a conveying system and a method of the type mentioned above, in which comminuted materials contaminated with undesirable substance components, in particular pollutants and/or interfering substances, can be rejected at an early stage.

According to the invention, this task is solved by the monitoring device in that at least one monitoring region covers at least one section of a conveying path of the conveying system, and in which region a content of at least one substance component in a comminuted material can be determined by means of at least one measuring apparatus during the conveyance of the comminuted materials, and at least one rejection apparatus is arranged downstream of at least one monitoring region in the direction of conveyance of the comminuted materials on the conveying path, by means of which device the comminuted materials can be rejected if the content of the at least one substance component determined by the at least one measuring apparatus exceeds a predetermined threshold value.

According to the invention, the content of at least one substance component in the comminuted materials is determined during conveyance in the conveying system. Comminuted materials possibly contaminated with undesirable substance components can already be rejected during conveyance with the aid of at least one rejection apparatus. In this way, materials contaminated with undesirable substance components can be detected and rejected more quickly. In contrast to the device known from prior art, the invention does not require a time-consuming examination in a laboratory, which leads to wait times.

The materials may be materials of plant origin, in particular wood, scrap wood, straw and/or renewable agricultural products, or plastic, composite material or the like.

The materials may be comminuted into chips, fibers, wood chips, shredded material or the like. The comminuted materials can be used as pressed material or grit, from which pressed plates can be produced.

Advantageously, the monitoring device can be used to detect undesirable substance components in the form of pollutants and/or interfering substances.

Monitoring for pollutants may be necessary, in particular required by law, for health and/or environmental reasons. For this purpose, the content of certain pollutants is checked. If the content of the pollutants exceeds a specified, in particular legally prescribed, threshold value, the comminuted material may not be further used. In particular, scrap wood contaminated with pollutants may not be used to produce pressed boards, as used, in particular, in the furniture industry or the like. If necessary, the comminuted material contaminated with pollutants must be disposed of.

The pollutants whose content can be monitored with the at least one measuring apparatus include in particular arsenic (As), lead (Pb), cadmium (Cd), chromium (Cr), copper (Cu), mercury (Hg), chlorine (Cl), fluorine (F), zinc (Zn), pentachlorophenol (PCP), polychlorinated biphenyls (PCB), carbolineum (benzo(a)pyrene), lindane (y-hexachlorocyclohexane), organotin compounds, boron wood preservatives (B), polycyclic aromatic hydrocarbons (PAH) or the like. Moreover, any radioactivity of undesirable substance components can be monitored using appropriate measuring equipment.

Interfering substances are substance components that hinder the planned recycling of the materials. If the material is scrap wood, inorganic or organic non-wood substances, in particular soil material, stones, concrete, metal parts, paper, cardboard, textiles, plastics or foils, which adhere to, are mixed with or are connected to the scrap wood, these can be considered as interfering substances.

Advantageously, the conveying installation can be combined with an installation for the production of material plates, in particular pressed plates. Comminuted materials can be conveyed with the conveying installation, from a comminuting device to a material press. The comminuting device can be used to provide the comminuted material, in particular the pressed material, from which, using the material press, the material plates are produced, in particular pressed plates.

In an advantageous embodiment, at least one monitoring region and/or at least one rejection apparatus can be arranged in at least one area of the conveying system, in which a diversion for rejected materials can be implemented. In this way, for example, comminuted material contaminated with undesired substance components can more easily be rejected.

Advantageously, the areas of the conveying system for at least one monitoring region and/or at least one rejection apparatus can have sufficient space for lines and/or containers for the rejected materials.

Advantageously, the areas of the conveying system for at least one monitoring region and/or at least one rejection apparatus can be accessible, in particular during operation of the conveying system. In this way, the at least one measuring apparatus and/or the at least one rejection apparatus can also be actuated, maintained and/or monitored during operation of the conveying system.

In a further advantageous embodiment, at least one monitoring region and/or at least one rejection apparatus may be arranged on a conveyor belt of the conveying system. The comminuted material can be distributed over a large area on a conveyor belt that conveys it. In this way, a monitoring region can extend in a defined planar manner over at least part of the width of the conveyor belt. A conveyor belt can be implemented in an easily accessible manner, in particular spatially open towards the top.

In a further advantageous embodiment, at least one rejection apparatus can comprise or consist of at least one sorter. With the aid of a sorter, the conveying path can be separated from a rejection path for loaded materials. Advantageously, a sorter can be controlled automatically. In this way, the rejection of contaminated material can be automated.

In a further advantageous embodiment, the monitoring device can have or be connected to at least one control and processing device with which information of the at least one measuring apparatus can be evaluated and with which the at least one measuring apparatus and/or the at least one rejection apparatus and/or the conveying system can be controlled on the basis of the information. In this way, the measurements of the content of the at least one substance component and, if necessary, a separation of contaminated comminuted materials can be carried out automatically. Furthermore, with the aid of the at least one control and processing device, if necessary, the conveying system can be controlled, in particular a conveying system can be stopped, if this, in particular, should be necessary on the basis of the information from the measurements of the at least one measuring apparatus.

In a further advantageous embodiment, at least one measuring apparatus can operate in contact-free manner. In this way, the measurements can be performed more quickly. Furthermore, an influence of the measurements on the at least one substance component to be measured and/or the comminuted materials can be reduced.

In a further advantageous embodiment, at least one measuring apparatus may comprise or consist of at least one optical system. With an optical system, the content of at least one substance component can be carried out in a contact-free manner, in particular during conveyance.

Advantageously, at least one measuring apparatus can have or consist of at least one spectroscopy system. Spectroscopy systems can be used to examine substance components in a contact-free manner.

Advantageously, at least one measuring apparatus can use one or more of the following analysis technologies: near infrared spectroscopy, Fourier transform infrared spectroscopy, optical molecular spectroscopy, in particular UVVIS spectroscopy, fluorescence spectroscopy, in particular laser-induced fluorescence spectroscopy, Raman spectroscopy, laser-induced plasma spectroscopy, X-ray fluorescence spectroscopy or X-ray fluorescence analysis, mass spectroscopy, ion mobility spectroscopy or the like.

In another advantageous embodiment, a monitoring device may comprise at least one analysis conveying path, which at least in part runs parallel to a main conveying path of the conveying system for the comminuted materials, wherein on the at least one analysis conveying path a representative portion of comminuted materials may be conveyed through the monitoring region of at least one measuring apparatus. In this way, a portion of comminuted materials can be separated and conveyed through the at least one monitoring region for analysis. The monitoring region can thus be arranged more flexibly, including beside the main conveying path. The portion of comminuted materials, which is conveyed on the analysis conveying path through the monitoring region, is representative of the comminuted materials, which are conveyed via the main conveying path. In particular, the composition, spatial distribution, density or the like of comminuted materials on the analysis conveying path is identical to the main conveying path.

Advantageously, an analysis conveyor belt can be realized parallel to a main conveyor belt, which runs through at least one monitoring region of at least one measuring apparatus.

Advantageously, an analysis conveyor can be realized as, in particular, a separate part of a main conveyor belt, which extends at least over the length of a monitoring region, over a defined width that is perpendicular to the direction of conveyance of the main conveyor belt. In this way, no separate analysis conveyor is required.

Furthermore, the task is solved in the conveying system according to the invention in that

- at least one monitoring region, in which a content of at least one substance component in a comminuted material can be determined by means of at least one measuring apparatus during the conveyance of the comminuted materials, surveys at least one section of a conveying path of the conveying system, and
- at least one rejection apparatus is arranged downstream of at least one monitoring region in the direction of conveyance of the comminuted materials on the conveying path, by means of which device the comminuted materials can be rejected if the content of the at least one substance component determined by the at least one measuring apparatus exceeds a predetermined threshold value.

According to the invention, materials comminuted with the at least one measuring apparatus are monitored for any undesirable substance components during conveyance with the conveying device. If a content of undesirable substance components above the predetermined threshold value is determined, the comminuted materials can already be rejected during conveyance in the conveying system.

In addition, the task is solved in the method according to the invention in that the content of at least one substance component is determined during the conveyance of the comminuted materials in at least one monitoring region on the conveying path and, if the content of the at least one substance component determined with the at least one measuring apparatus exceeds a predetermined threshold value, the comminuted materials are rejected downstream of the at least one monitoring region in the direction of conveyance.

According to the invention, the at least one measuring apparatus is used to monitor comminuted materials for any undesirable substance components during conveyance by the conveying system. If a content of undesirable substance components is determined which exceeds the specified threshold value, the comminuted materials are already rejected during conveyance in the conveying system.

In an advantageous embodiment of the method, the content of at least one substance component can be determined without contact. In this way, monitoring can be carried out more quickly. Furthermore, the substance component and/or the comminuted materials to be measured are not influenced, in particular changed, by the measurement.

In a further advantageous embodiment of the method, the content of at least one substance component can be determined on an ongoing basis. In this way, the content of the at least one substance component in the comminuted materials can continuously be monitored during conveyance. The risk of comminuted materials contaminated with undesirable substance components being provided at the end of the conveying system can thus be reduced.

In a further advantageous embodiment of the method, comminuted materials contaminated with undesirable substance components can be rejected automatically. In this way, a generally faster conveyance of the comminuted materials and a faster operation of the conveying system can, in particular, be realized.

Advantageously, comminuted materials contaminated with undesirable substance components can be rejected. In this way, impairment of the further conveying operation of the conveying system can be reduced.

In all other respects, the features and advantages shown in connection with the monitoring device according to the invention, the conveying system according to the invention and the method according to the invention and their respective advantageous embodiments apply, with the necessary changes having been made to one another and vice versa. The individual features and advantages can, of course, be combined with one another, whereby further advantageous effects can arise which go beyond the sum of the individual effects.

Further advantages, features and details of the invention result from the following description, in which an embodiment example of the invention is explained in more detail with reference to the drawing. The person skilled in the art will expediently also consider the features disclosed in combination in the drawing, the description and the claims both individually and combine them to form useful further combinations.

BRIEF DESCRIPTION OF THE DRAWINGS

The FIGURE schematically shows a functional representation of a conveying system for conveying comminuted materials with a monitoring device with which a content of undesirable substance components in the comminuted materials can be determined and any materials contaminated with undesirable substance components can be rejected. In the FIGURE, identical components are provided with identical reference signs.

In the FIGURE, a functional representation of a conveying system 10 of an installation 11 for the production of material plates is shown. The conveying system 10 is used for conveying comminuted materials.

DETAILED DESCRIPTION

Referring to the FIGURE, representative materials may be, for example, materials of plant origin, in particular wood, scrap wood, straw and/or renewable agricultural products, or plastic, composite material or the like.

By way of example, the conveying system 10 is arranged between a comminuting device 12 for comminuting the materials and a material press 14. The material press 14 is used to press the comminuted materials into press plates.

The materials to be comminuted are provided, by way of example, from a silo 16. A material feed line 18 leads from the silo 16 to the comminuting device 12. By way of example, only one comminuting device 12 is shown. Several comminuting devices 12 can also be provided, including functionally in parallel.

By way of example, the conveying system 10 has a total of three conveyor belts 20A, 20B and 20C and two conveyors 22A and 22B. The conveyor belts 20A, 20B and 20C and the conveyors 22A and 22B are used to convey the comminuted materials from the comminuting device 12 to the material press 14.

The first conveyor belt 20A leads from the comminuting device 12 to the first conveyor 22A. The second conveyor belt 20B is arranged between the first conveyor 22A and the second conveyor 22B. The third conveyor belt 20C leads from the second conveyor 22B to the material press 14.

Spatial distances and height differences between the comminuting device 12 and the material press 14 are bridged through the use of the conveyor belts 20A, 20B and 20C and the conveyors 22A and 22B.

The conveying system 10 further includes a monitoring device 24. The monitoring device 24 is used to monitor the content of undesirable substance components that may be present in the comminuted materials. The undesirable substance components may be pollutants or interfering substances.

By monitoring the content of pollutants, it can, in particular, be ensured that legally specified threshold values for pollutants are not exceeded. Examples of pollutants whose content can be monitored by the monitoring device 24 include arsenic (AS), lead (Pb), cadmium (Cd), chromium (Cr), copper (Cu), mercury (Hg), chlorine (Cl), fluorine (F), zinc (Zn), pentachlorophenol (PCP), polychlorinated biphenyls (PCBs), carbolineum (benzo(a)pyrene), lindane (y-hexachlorocyclohexane), organotin compounds, boron wood preservatives (B), polycyclic aromatic hydrocarbons (PAHs), or the like. Alternatively, or additionally, the monitoring device 24 may be used to monitor the radioactivity of pollutants.

Interfering substances are substance components that hinder the planned recycling of the materials. If the material is scrap wood, for example, inorganic or organic non-wood substances, in particular soil material, stones, concrete, metal parts, paper, cardboard, textiles, plastics or foils, which adhere to, are admixed with or are connected to the scrap wood, these can be considered as interfering substances.

By way of example, the monitoring device 24 includes three measuring and rejection systems 26A, 26B, and 26C. By way of example, each of the measuring and rejection systems 26A, 26B and 26C is associated with one of the conveyor belts 20A, 20B and 20C. If necessary, comminuted materials contaminated with unwanted substance components can be rejected more easily from the conveyor belts 20A, 20B and 20C than from the conveyors 22A and 22B. Moreover, there is sufficient space in the area of the conveyor belts 20A, 20B and 20C to arrange the measuring and rejection systems 26A, 26B and 26C.

Each of the measuring and rejection systems 26A, 26B and 26C comprises a measuring apparatus 28A, 28B or alternatively 28C, a rejection apparatus 30A, 30B or alternatively 30C, a control and processing device 32A, 32B or alternatively 32C, and a rejection-collection container 34A, 34B or alternatively 34C.

The respective content of undesirable substance components in the comminuted materials can be determined using the measuring apparatuses 28A, 28B and 28C. The measuring apparatuses 28A, 28B and 28C, shown by way of example, may operate according to different principles and/or may be provided for detecting different substance components.

By way of example, the measuring apparatus 28A, 28B, and 28C may utilize one or more of the following analytical technologies: near infrared spectroscopy, Fourier transform infrared spectroscopy, optical molecular spectroscopy, in particular UVVIS spectroscopy, fluorescence spectroscopy, in particular laser-induced fluorescence spectroscopy, Raman spectroscopy, laser-induced plasma spectroscopy, X-ray fluorescence spectroscopy, X-ray fluorescence analysis, mass spectroscopy, ion mobility spectroscopy or the like.

Each of the measuring apparatuses 28A, 28B and 28C is designed to detect the comminuted materials conveyed through a respective monitoring region 36A, 36B or 36C and to determine the content of any undesirable substance components contained therein during conveyance.

The first two monitoring regions 36A and 36B are located on a conveying path of the conveying system 10, which is formed by the respective conveyor belt 20A or 20B. The third monitoring region 36C is located on a conveyor path formed by an analysis conveyor belt 42 extending parallel to the third conveyor belt 20C. The analysis conveyor belt 42 is connected to the main conveyor belt, namely the third conveyor belt 20C, by means of corresponding branch lines. On the analysis conveyor belt 42, a representative portion of comminuted material is conveyed through the third monitoring region 36C.

The rejection apparatus 30A, 30B or alternatively 30C of the corresponding measuring and rejection system 26A, 26B or alternatively 26C is arranged in a direction 38 of the comminuted materials on the respective conveyor belt 20A, 20B and 20C downstream from the monitoring region 36A, 36B or 36C of the respective measuring apparatus 28A, 28B and 28C. The rejection apparatuses 30A, 30B and 30C are designed, for example, as automatically operable sorters.

If the content of undesirable substance components determined by the respective measuring apparatus 28A, 28B or alternatively 28C exceeds a threshold value specified, for example, by law, the respective rejection apparatus 30A, 30B or alternatively 30C is switched in such a way that it is used to reject the comminuted materials on the respective conveyor belt 20A, 20B or alternatively 20C.

The rejected comminuted materials, which are contaminated with unwanted substance components, are fed to the corresponding rejection-collection container 34A, 34B or 34C and are collected there.

Overall, the content of undesirable substance components is determined on an ongoing/continuous basis during the conveyance of the comminuted materials and comminuted materials contaminated with undesirable substance components are automatically rejected.

The measuring apparatus 28A, 28B and 28C and the rejection apparatus 30 of the respective measuring and rejection systems 26A, 26B and 26C are functionally connected to the corresponding control and processing device 32A, 32B and 32C. The measuring apparatus 28A, 28B and 28C are controlled by the control and processing device 32A, 32B and 32C which are also used to evaluate the respective measurement information of the measuring apparatus 28A, 28B and 28C. The control and processing devices 32A, 32B and 32C are used to compare the measured values with correspondingly predefined threshold values, stored for example in tables, for the respective undesirable substance components and, if the threshold values are exceeded, to control the respective rejection apparatus 30 accordingly.

The control and processing devices 32A, 32B and 32C are each connected to a central control device 40 of the conveying system 10. With the control device 40, if necessary, the conveying system 10 can be controlled, for example stopped, on the basis of information from the control and processing devices 32A, 32B and 32C of the measuring and rejection systems 26A, 26B and 26C.

During operation of the installation 11, materials to be comminuted are fed from the silo 16 to the comminuting device 12. The comminuting device 12 is used to comminute the materials. The comminuted materials are initially fed to the first conveyor belt 20A.

When the comminuted materials are conveyed on the first conveyor belt 20A, the content of undesirable first substance components is determined with the first measuring apparatus 28A arranged there. If necessary, the first rejection apparatus 30A rejects the comminuted materials and collects them in the first rejection-collection container 34A.

If the content of undesirable first substance components does not exceed the corresponding threshold values, the comminuted materials are conveyed further to the first conveyor 22A. The first conveyor 22*a* conveys the comminuted materials to the second conveyor belt 20B.

While being conveyed on the second conveyor belt 20B, the second measuring and rejection system 26B determines the content of undesired second substance components. If necessary, the comminuted materials are rejected by the second rejection apparatus 30B and fed to the second rejection-collection container 34B.

If the content of undesirable second substance components does not exceed the corresponding threshold values, the comminuted materials are conveyed further to the second conveyor 22B. The second conveyor 22B conveys the comminuted materials to the third conveyor belt 20C.

There, the third measuring and rejection system 26C determines the content of undesirable third substance components.

If the content of unwanted third substance components exceeds the corresponding threshold value, the comminuted materials are rejected by the third rejection system 30C and fed to the third rejection-collection container 34C. Otherwise, the comminuted materials are fed to the material press 14 for further processing and pressing into material plates.

Instead of the different measuring apparatuses 28A, 28B and 28C, measuring apparatus operating according to the same principle can also be provided. In this case, the measuring and rejection systems 26A, 26B and 26C can be redundant.

Instead of three rejection-collection containers 34A, 34B, and 34C, only a single rejection-collection container 34A, 34B, and 34C may be provided.

Instead of a total of three measuring and rejection systems 26A, 26B, and 26C, fewer or more measuring and rejection systems may be provided.

Instead of separate control and processing devices 32A, 32B and 32C, the measuring and rejection systems 26A, 26B and 26C can also have a common control and processing device.

Basically identical or also different rejection apparatuses 30A, 30B and 30C may be provided.

In an embodiment that is not shown, a measuring apparatus may also be provided, for example, at a location immediately downstream of the comminuting device 12 at the beginning of the conveying path of the conveying system 10, and one or more rejection apparatuses may be arranged at the end of the conveying path. In this way, a longer reaction time is available in which a measurement can be evaluated by the corresponding measuring apparatus.

The invention claimed is:

1. A monitoring device of a conveying system for comminuted materials, having at least one measuring apparatus with which at least one substance component in a first comminuted material and a second comminuted material of the comminuted materials can be detected, wherein at least one monitoring region covers at least a section of a conveying path of the conveying system, and in which region a first content of the at least one substance component in the first comminuted material and a second content of the at least one substance component in the second comminuted material can be determined by the at least one measuring apparatus during the conveyance of the comminuted materials, at least one control and processing device configured to stop the conveying system based on information from the at least one measuring apparatus, at least one rejection apparatus is arranged downstream of the at least one monitoring region in a direction of conveyance of the comminuted materials on the conveying path, the at least one rejection apparatus being configured to reject the first comminuted material when the first content of the at least one substance component determined by the at least one measuring apparatus exceeds a predetermined threshold value, and a material press is arranged downstream of the at least one rejection apparatus in the direction of conveyance of the comminuted materials on the conveying path, the material press being configured to cause the second comminuted material to be pressed when the second content of the at least one substance component determined by the at least one measuring apparatus is less than the predetermined threshold value.

2. The monitoring device according to claim 1, wherein the at least one monitoring region and/or the at least one rejection apparatus is arranged in at least one area of the conveying system in which a diversion for rejected materials can be implemented.

3. The monitoring device according to claim 1, wherein the at least one monitoring region and/or the at least one rejection apparatus is arranged on a conveyor belt of the conveying system.

4. The monitoring device according to claim 1, wherein the at least one rejection apparatus comprises or consists of at least one sorter.

5. The monitoring device according to claim 1, wherein the at least one control and processing device is configured to evaluate information of the at least one measuring apparatus, and wherein the at least one measuring apparatus and/or the at least one rejection apparatus and/or the conveying system can be controlled on the basis of the information.

6. The monitoring device according to claim 1, wherein the at least one measuring apparatus operates without contact.

7. The monitoring device according to claim 1, wherein the at least one measuring apparatus comprises or consists of at least one optical system.

8. The monitoring device according to claim 1, wherein a monitoring device comprises at least one analysis conveying path, which runs at least in sections parallel to a main conveying path of the conveying system for the comminuted materials, wherein on the at least one analysis conveying path, a representative portion of comminuted materials can be conveyed through the monitoring region of the at least one measuring apparatus.

9. The monitoring device according to claim 1, wherein the monitoring device is able to detect undesirable substance components in the form of at least one of pollutants or interfering substances.

10. The monitoring device according to claim 9, wherein the pollutants comprise at least one of arsenic (As), lead (Pb), cadmium (Cd), chromium (Cr), copper (Cu), mercury (Hg), chlorine (Cl), fluorine (F), zinc (Zn), pentachlorophenol (PCP), polychlorinated biphenyls (PCB), carbolineum (benzo (a) pyrene), lindane (y-hexachlorocyclohexane), organotin compounds, boron wood preservatives (B), or polycyclic aromatic hydrocarbons (PAH).

11. The monitoring device according to claim 9, wherein the interfering substances are substance components hindering recycling of the first comminuted material, the interfering substances comprising at least one of soil, stone, concrete, metal, paper, cardboard, textile, plastic or foil.

12. A conveying system for comminuted materials, having at least one conveying device with which the comminuted materials can be conveyed along a conveying path, and having at least one monitoring device which has at least one measuring apparatus, the at least one measuring apparatus configured to detect at least one substance component in a first comminuted material and a second comminuted material of the comminuted materials, wherein at least one monitoring region, in which the at least one measuring apparatus is configured to determine a first content of the at least one substance component in the first comminuted material and a second content of the at least one substance component in the second comminuted material during the conveyance of the comminuted materials, covers at least a section of the conveying path of the conveying system, at least one control and processing device is configured to stop the conveying system based on information from the at least one measuring apparatus, at least one rejection apparatus is arranged downstream of the at least one monitoring region in a direction of conveyance of the comminuted materials on the conveying path, the at least one rejection apparatus being configured to reject the first comminuted material when the first content of the at least one substance component determined by the at least one measuring apparatus exceeds a predetermined threshold value, and a material press is arranged downstream of the at least one rejection apparatus in the direction of conveyance of the comminuted materials on the conveying path, the material press being configured to cause the second comminuted material to be pressed when the second content of the at least one substance component determined by the at least one measuring apparatus is less than the predetermined threshold value.

13. The conveying system according to claim 12, wherein the first content is determined to include at least one of arsenic (As), lead (Pb), cadmium (Cd), chromium (Cr), copper (Cu), mercury (Hg), chlorine (Cl), fluorine (F), zinc (Zn), pentachlorophenol (PCP), polychlorinated biphenyls (PCB), carbolineum (benzo (a) pyrene), lindane (y-hexachlorocyclohexane), organotin compounds, boron wood preservatives (B), or polycyclic aromatic hydrocarbons (PAHs).

* * * * *